United States Patent [19]

Winters et al.

[11] Patent Number: 4,479,981

[45] Date of Patent: * Oct. 30, 1984

[54] WATER-BORNE HARD COATING COMPOSITIONS AND PROCESSES THEREFOR

[75] Inventors: Jonathan K. Winters, Portsmouth, Ohio; Fred B. Savell, III, Mobile, Ala.

[73] Assignee: Ashland Oil, Inc., Ashland, Ky.

[*] Notice: The portion of the term of this patent subsequent to Apr. 24, 2001 has been disclaimed.

[21] Appl. No.: 374,467

[22] Filed: May 3, 1982

[51] Int. Cl.³ .................... C04B 9/02; B05D 1/08; B05D 1/20; B05D 1/00

[52] U.S. Cl. .................... 427/27; 106/14.13; 106/14.15; 106/14.18; 106/14.34; 427/428; 427/429; 427/435; 428/467

[58] Field of Search .................... 106/14.35, 271, 10, 106/14.11–14.34; 428/467

[56] References Cited

U.S. PATENT DOCUMENTS

| | | | |
|---|---|---|---|
| Re. 27,890 | 1/1974 | Holbus | 106/14.11 |
| 2,598,666 | 6/1952 | Sesso et al. | 106/10 |
| 2,677,618 | 5/1954 | Deiman et al. | 106/14.13 |
| 2,882,171 | 4/1959 | Denman | 106/14.13 |
| 2,911,309 | 11/1959 | Rudel | 106/14.27 |
| 3,086,870 | 4/1963 | Sheldahl | 106/14.27 |
| 3,132,055 | 5/1964 | Tanaka | 148/6.16 |
| 3,175,964 | 3/1965 | Watanabe | 204/37 |
| 3,248,350 | 4/1966 | Triggle | 260/17 |
| 3,711,420 | 1/1973 | Jones | 106/14.24 |
| 4,055,433 | 10/1977 | Morones | 106/10 |
| 4,315,957 | 2/1982 | Hereth | 106/271 |
| 4,360,385 | 11/1982 | Grunewalder | 106/2 |

*Primary Examiner*—Theodore Morris
*Attorney, Agent, or Firm*—Richard C. Willson, Jr.; Mary Louise Beall

[57] ABSTRACT

Thixotropic water reducible, dispersible, corrosion resistant coating composition comprising amine salt of blended microcrystalline waxes in which the waxes have an acid number of 7-200 and the amine is preferably morpholine with C-8-30 carboxylic acid, preferably oleic, an overbased alkaline earth sulfonate, e.g., SACI, an alcoholic coupling solvent, e.g., propyl glycol ether and water (Tectyl 310).

41 Claims, No Drawings

WATER-BORNE HARD COATING COMPOSITIONS AND PROCESSES THEREFOR

CROSS REFERENCES TO RELATED APPLICATIONS

The present application discloses compositions and techniques related to those of (RI-6141) U.S. patent application Ser. No. 374,466 filed May 3, 1982 and also to (RI-6143) U.S. patent application Ser. No. 382,853 filed May 24, 1982, and also to (RI-6173) U.S. patent application Ser. No. 374,465 filed May 3, 1982.

BACKGROUND OF THE INVENTION

(1) Field of the Invention

The present invention relates particularly to organic coating compositions and methods for their use generally classified in Class 106, particularly in Subclasses 14.11, 14.13, 14.15, 14.16, 14.34, 14.35, 14.37, 14.38, 270, 271 and 272.

(2) Description of the Prior Art

U.S. Pat. No. 3,539,367 to Yaroshevich, et al discloses a wax emulsion containing a salt of an organic acid and an amine. U.S. Pat. No. 3,660,128 to Sheldahl teaches an alkanolamine and an aliphatic carboxylic acid in the preparation of a semi-solid wax-in-water emulsion. U.S. Pat. No. 2,349,326 to Wilson teaches a combination of morpholine and a fatty acid to emulsify waxy materials in water for paste-type waxes. U.S. Pat. No. 3,125,453 to Simmonds employs a mixture of triethanolamine and an acid to emulsify a mixture of waxes also for paste-type polishes.

U.S. Pat. No. 4,035,514 to Davis, teaches a water-dispersable petrolatum composition containing cetyl alcohol, lanolin alcohols and alkoxylate fatty acid esters of sorbitol.

Most of the above teach production of temporary coatings such as floor waxes, cosmetics and the like. In contrast, the present invention, possibly through the use of co-solvents which tend to form azeotropes which enhance water removal during curing, provides coatings having substantial life even in corrosive environments. While not wishing to be bound to any theory or mechanism, it appears the co-solvents tend to act as dispersing agents and additionally enhance stability of the liquid compositions at low temperatures.

Also, the inclusion of the salts of organic acids in the present invention tends to build longer-chain molecules which additionally deter corrosion and promote stability.

The coatings of the present invention find additional utility as lubricants, e.g. for extrusion and impact forming operations.

In brief review, other prior U.S. patents of interest include:

U.S. Pat. No. 3,539,367 to Yaroshevich, relating to cationic emulsions (the compositions of the present invention are not cationic emulsions);

U.S. Pat. No. 3,660,128 to Sheldahl, relating to inverted wax emulsion pastes for artwork;

U.S. Pat. Nos. 2,349,326 to Wilson and 3,125,453 to Simonds, both relating to paste type polishes;

U.S. Pat. Nos. 2,862,825 to Westlund et al, 2,943,945 to Saywell, and 3,565,843 to Kassinger, all relating to soluble oils, not to firm wax coatings;

U.S. Pat. No. 3,434,851 to Miller, relating to solvent-borne asphalt coatings;

U.S. Pat. Nos. 3,446,764 to Phillips, 3,699,065 to Clark, 4,184,991 to Scheurman III, 3,223,666 to Botton, 3,379,548 to Jen, 4,039,495 to Hunsucker, 4,051,089 to Tobias, and 4,081,411 to Hunsucker, all relating to base resin formulas not to completed coatings;

U.S. Pat. No. 3,494,882 to Andrews, relating to high gloss emulsified polyester emulsions;

U.S. Pat. No. 4,187,204 to Howard, relating to water-borne paint containing not over 10% water;

U.S. Pat. No. 4,225,477 to Vosishth and Wang, relating to co-solvent changes in water-borne coatings to control re-coatability (the coating's ability to form a substrate for a topcoat);

U.S. Pat. No. 4,148,948 to Williams, relating to a leveling additive for water dispersible paints; and, U.S. Pat. No. 3,413,227 to Howard and Randell, relating to substituted benzoitriazole.

Other patents considered in preparing this application are:

| | |
|---|---|
| 3,879,335 | Storck, et al |
| 2,695,910 | Asseff, P. A., et al |
| 3,565,678 | Johnson, et al |
| 4,239,648 | Marshall, et al |
| 4,059,452 | Nishijima, et al |
| 3,653,931 | Burchart, et al |
| 3,985,584 | Chan, et al |
| 4,048,374 | Kotzach, et al |
| 3,839,051 | Carreny, L. |
| 3,903,346 | Delcon, et al |
| 3,864,322 | Yalloorakis, M. D. |
| 4,062,821 | Hung, T. M. |
| 3,773,550 | Tomalia, D. A. |
| 4,035,514 | Davis, R. I. |
| 4,162,920 | Gillich, T. N. |
| 3,661,796 | Erby, et al |
| 3,313,635 | Wollak, et al |
| 3,080,221 | Fessler, et al |
| 3,738,851 | Jarvis, W. H. |
| 3,726,807 | Johnson, K. L. |

U.S. Pat. No. 3,642,653 to Northan reports use of a microcrystalline wax in non-water-borne systems. Other sulfonate-based systems are reported in the following patents:

| | |
|---|---|
| U.S. Pat. No. 4,161,566 | Higgins |
| U.S. Pat. No. 3,907,578 | Scherer, et al |
| U.S. Pat. No. 3,925,087 | Lechner, et al |
| U S. Pat. No. 3,849,316 | Motley, et al |
| U S. Pat. No. 3,728,277 | Foley |
| U.S. Pat. No. 3,654,177 | Foley |

Problems with metal preservative coatings, especially those primarily intended for long-term storage protection, have always existed. Prominent difficulties have been tackiness, sensitivity to water, objectionable odor, non-availability of light colored coatings and, where water-borne compositions are involved, limited high-temperature storage stability of the compositions themselves.

Many attempts have been made to modify conventional, organic rust preventive vehicles to reduce their water sensitivity (fogging, clouding, stripping in the presence of water) and simultaneously provide a water dispersible formulation. In the past, the two properties have been found to be largely mutually exclusive, i.e. a trade off was necessary in reduced water dispersibility in order to improve water sensitivity.

The coating compositions of the present invention are water-borne, storage stable, even at higher temperatures, and provide coatings which usually are non-tacky, which can be light in color, which have low odor levels, which display enhanced corrosion prevention.

SUMMARY

(1) General Statement of the Invention

The present invention relates to water-borne coating compositions of high temperature (e.g. 52° C.) storage stability which, when applied to a substrate, usually form a firm, resistant, permanent, low odor, lubricating, corrosion preventative film capable of being formulated in light colors.

More particularly, the coating compositions of the present invention, which are capable of application and flow onto a solid substrate, comprise: (1) usually one or more waxes, (2) one or more organic sulfonates (3) one or more surfactants, (4) one or more coupling agents which are carefully selected to result in final dispersion stable at higher temperatures and (5) water; to form a water-borne dispersion for greatly improved corrosion resistance, especially when employed as a long-term coating for metal.

(2) Utility of the Invention

The invention provides valuable coating formulations having excellent corrosion protection and storage stability.

DESCRIPTION OF THE PREFERRED EMBODIMENTS STARTING MATERIALS

Waxes

Preferably the compositions of the present invention will include refined microcrystalline wax which contains less than 0.1 to about 5 and more preferably 0.1 to about 3 weight percent oil based on the weight of the wax combined with esterified waxes though other types of wax may occasionally be substituted for specialized applications. Preferred wax melting points will be above 50° C., (148° F.), more preferably from 60° to 100° C. (140° to 212° F.) and most preferably from 65° to 90° C. (150° to 194° F.). Such micro waxes can be naturally derived, e.g. those manufactured in the processing of petroleum crude oils, or synthetically manufactured, e.g. polyolefin waxes such as polyethylene or polypropylene waxes. The average molecular weight of the waxes useful in the present invention should be selected so as to provide good film formation and permanence but molecular weight is not narrowly critical and will be easily selected by those skilled in the art. Also, the degree of branching in the wax molecules should be selected so the average degree of crystallinity permits the wax to be easily dispersed and to be compatible with the other ingredients of the particular formulation being produced. Chain branching provides sites for esterification in the case of oxygenated waxes; these are also suitable for use in most applications with the present invention. Oxygenated waxes (oxwax) will preferably have an acid number in the range of from about 15 to about 200, most preferably from 25 to about 45. The wax can contain at least 50% essentially saturated wax based on the total weight of the wax.

Specific waxes useful for the present invention include: natural waxes, such as a semi-refined paraffin available from Shell Oil of Houston; petrolatum, widely available; synthetic waxes, such as polyethylene waxes available from Bareco Corporation of Tulsa, Okla. or the Epolene brand available from Eastman Kodak of Rochester, N.Y. or oxygenated waxes, which can be readily manufactured in petroleum refineries utilizing well-known techniques, or those available from Durachem Corporation of Harrison, N.Y. Others include: Polywax 55 (Bareco) and Mobil Microwax 2305 (Mobile Oil).

The amount of waxes to be utilized with the present invention is not narrowly critical and, in fact, for special applications the wax can even be omitted with additional quantities of the esters or sulfonates described below being employed. For most formulations the wax content will be from 0.5 to 30%, more preferably from about 5 to 25% and most preferably from about 12 to about 20% by weight.

All percents given herein are percents by weight based on the weight of the total formulation unless otherwise expressly stated.

Organic Sulfonates

The preferable compositions of the present invention will include sulfonates overbased with barium, calcium or sodium, which are water dispersible by the methods described herein and have sufficient molecular weight to provide extended rust protection against corrosive environments. The preferable molecular weights of these sulfonates, which are derived from alkyl benzene, are as follows when overbased with the following metal sulfonates: sodium sulfonate or a molecular weight preferably 370 to 750, more preferably 400 to 650 and most preferably 450 to 600; barium sulfonate of a molecular weight preferably 400 to 1400, more preferably 700 to 1300, most preferably 800 to 1200; and calcium sulfonate of a molecular weight preferably 370 to 850, more preferably 400 to 800, most preferably 500 to 750.

Esters (Optional)

The esters which can be optionally used for the present invention are preferably polyfunctional esters of carboxylic acids, preferably of fatty acids having 6 to 30 carbons. Mono-esters may find occasional use in special circumstances. Particularly preferred are the polyesters of naturally-derived fatty acids such as organic acid esters of glycerine, coconut oil, tall oil, soya oil acids, stearic acid, preferably, isostearic acid, linoleic acid, oleic acid, and polyols, e.g. neopentylglycol, trimethylol propane and pentaerythrol. Most preferred is the dilanolinic acid ester of pentaerythritol.

Useful commercial polyol esters comprise: "Pentalan" from Croda Chemical Company of England, a tetrahydric lanolin alcohol; Degras manufactured by Emory Industries of Linden, N.J. and FAI manufactured by Arizona Chemical of New York City.

Table I illustrates the starting materials and properties for preparation of a number of suitable esters.

In PE I through PE IV, the PE used is in a 1:4 molar ratio to the fatty acid content of the charge and the water collected is essentially equivalent to theory on the basis of PE weight. (A slightly greater amount of water is obtained where oxwax is involved).

Initial charge to the reactor is 50% toluene/50% oxwax-lanolin components to base handling and moderate initial reaction.

PE-I and PE-II have small amounts of insoluble resins—these are filtered out.

Adjustment of residual acid number for esters up to 25 is made with oxwax.

TABLE I

GLYCEROL AND PENTAERYTHRITOL ESTERS OF 100 NEUTRAL OXYGENATED WAX (93 ACID NO.)

| Charge (g): | GE-I | GE-II | GE-III | PE-I | PE-II | PE-III | PE-IV |
|---|---|---|---|---|---|---|---|
| Toluene | 200.1 | 200.0 | 200.1 | 200.4 | 200.4 | 200.1 | 200.2 |
| OO Oxwax 91 | 150.1 | 100.0 | 200.1 | 150.3 | 100.2 | 200.1 | 00 |
| Lanolin FA 147 | 50.0 | 100.0 | 00 | 50.1 | 100.2 | 00 | 20.2 |
| Glycerol | 10.0 | 20.0 | 31.5 | 00 | 00 | 00 | 00 |
| Pentaerithritol | 00 | 00 | 00 | 11.0 | 22.0 | 33.0 | 44.0 |
| para-Toluene Surfonic Acid-Catalyst | 1.0 | 2.0 | 3.1 | 1.0 | 2.0 | 3.0 | 3.9 |
| Total | 411.2 | 422.0 | 434.8 | 412.8 | 424.7 | 436.1 | 448.3 |
| H₂O/Azeotrope (g) | 6.0+ | 9.5+ | 12.0 | 5.5 | 8.0 | 12.7 | 13.2 |
| Toluene-320° | *— | *— | 161.1 | 163.7 | 174.3 | 166.6 | 171.0 |
| Product | 233.7 | 238.8 | 259.6 | 240.2 | 243.5 | 251.6 | 254.7 |
| Residues | 0.4 | 1.3 | 2.2 | 0 | 61 | 5.4 | 10.0 |
| Total Product | — | — | 434.9 | 409.4 | 425.8 | 436.3 | 448.9 |
| Acid No. | 33.4 | 14.6 | 9.2 | 26.8 | 12.5 | 22.1 | 12.3 |
| Saponification No. | 197 | 170 | 150 | 174 | 167 | 202 | 174 |
| Wt % Yield | 56.8 | 56.5 | 59.7 | 58.2 | 57.3 | 57.1 | 56.8 |
| Wt % Toluene in Prod. | — | — | 15.0 | 15.1 | 10.7 | 13.3 | 11.5 |

*Lost condenser water

The quantity of esters employed with the present invention will not be narrowly critical and will depend to a substantial degree on the other ingredients and their amounts as selected for the particular formulation. Preferably the compositions will contain from about 0% to about 30%, more preferably from about 5% to about 10% and most preferably from about 8% to about 12% percent polyol esters based on the total weight of the esters as compared to the total weight of the formulation.

Surfactants

Surfactants useful with the present invention include natural surfactants such as salts of oleic acid, e.g. morpholine salts of oleic acid, or the similar salt of triethanolamine and entirely synthetic surfactants such as alkanol amides, e.g. WHC by Stepan Chemical Company of Chicago, Ill. (oleyl diethanol amide), sorbitan monooleates manufactured by ICI America of Wilmington, Del., isostearic acid salts, coconut oil salts, lauric acid salts and the like. Excess carboxylic acid, e.g. in the wax components, can react with amines in situ to form salts which act as surfactants. The preferred range is 2 to 8% carboxylic acid and 1 to 5% amine. All or part of the surfactant can be organic sulfonates, e.g. alkyl lauryl sulfonate or alkyl benzene sulfonates.

Suitable surfactants comprise the reaction products of amines such as morpholine, ethanolamine, triethanolamine, ammonia, diethanolamine and trithanolamine with carboxylic acids such as those mentioned above. The compositions of the present invention will generally include surfactants in the amount of from about 0.5 to about 6, more preferably from about 3 to about 5 and most preferably from about 3 to about 4 percent by weight based on the weight of the formulation. However, this will vary in response to the selection and quantities of the other ingredients employed.

Coupling Agents

The use of coupling agents is a special feature of the invention.

Several types of coupling agents can be employed with the invention including liquid hydrocarbon solvents, kerosene and mineral spirits, e.g. ethylene glycol ethers, preferably butyl and propyl ethers; hydroxy ethers (ether-alcohols), such as propyl cellosolve, (Ektasolve EP manufactured by Eastman Kodak of Rochester, N.Y.), diethylene glycol monoethyl ether, monopropyl ether of ethylene glycol, propyl cellosolve, ethyl cellosolve, and diethylene glycol monoethyl ether, and other coupling agents which will be evident to those skilled in the art for use in specialized formulations according to the present invention. The coupling agent is selected by physical test; anything which does not interfere with the formulations of the present invention and which renders their ingredients mutually soluble in the water base will generally be acceptable.

Alcohol ether-esters may also be used e.g. ethylene glycol monoacetate, diethylene glycol monoproprionate, diethylene glycol monoacetate, and propylene glycol monoacetate.

Alcohols, such as ethanol, isopropanol and isobutanol will generally be useful as coupling agents for the invention. Other commercial coupling agents which are useful with formulations of the present invention include: Ektasolve EP, manufactured by Eastman Kodak of New York, and Propasol P, manufactured by Union Carbide of Danbury, Conn.

The coupling agents of the present invention will generally be employed in quantities of from about 10% to about 30% or more, more preferably from about 15 to about 25%, and most preferably from about 18 to about 22% based on the weight of the total formulation. In addition to acting as a coupling compound, the coupling agent will usually be useful during the drying and curing process after application of the coatings composition of the present invention to substrates. For example, when carefully selected, the coupling agent will form an azeotrope with the water present in the formulation, thus increasing volatility, speeding cure, and providing a more permanent coating. Some coupling agents will assist the final coating in other ways, e.g. by providing leveling of the final coating, avoiding pinholes and providing a more continuous, better quality dry film.

Water

Deionized water will preferably be employed with the formulations of the present invention in order to prevent reaction of chlorine, calcium, magnesium or other components of tap water from interfering with the formulations or their curing. Distilled water could, of course, be employed but will generally be avoided for economic reasons.

Formulations of the present invention will generally contain a minimum of about 30%, more preferably 40% and most preferably 45% or even more of water based on the total weight of the formulation. As the formulations of the present invention are generally classifiable as oil-in-water emulsions of special character, a quantity of water greater than about 92% may cause swelling and loss of wetting properties in most of the formulations of the present invention although specialized formulations utilizing carefully selected non-aqueous ingredients may tolerate water up to an amount of 97% by weight based on the weight of the total formulation.

pH

The pH of the finished formulations will be preferably in the range of 7.0–10 with 8.0–9.0 being preferred. The nature of the emulsion will depend heavily upon the amount of soap produced when the emulsifying agent (fatty acid) is neutralized with an alkaline material (e.g. amines, triethanolamine, morpholine). One should slightly overbase (make alkaline) the system to obtain maximum soap production by reacting any residual acids which may be left over at the normal end point of titration. Excessive amounts of base will form an extremely "hard" salt which is not miscible in water, thus causing the aqueous and non aqueous phases to separate.

HLB

Hydrophile-lipophile balance—In the selection of amides for the invention one should obtain an amide with an HLB value of about 8 to 12, preferably 9 to 11 to facilitate making an oil-in-water emulsion. An anionic surfactant would be preferred due to its better corrosion inhibiting properties.

Sulfonates

A particular feature of the present invention is the inclusion in the formulation of organic sulfonates. For best corrosion protection, it has been discovered that the preferred organic sulfonates are over-based (i.e., made with an excess of calcium carbonate). The most preferred type of organic sulfonate is the Severe Atmospheric Corrosion Inhibitor ("SACI") available commercially from Wittco Chemical Company of Tulsa, Okla. These over based sulfonates impart exceptional corrosion protection and mix well with the other components of the invention. The preferred mixing order is to add the SACI or other organic sulfonates as the last ingredient, thus permitting the other ingredients to interreact prior to the introduction of the organic sulfonates. Without being bound by any theory, it appears that the technique of adding the SACI or other organic sulfonate last avoids interference of the calcium carbonate with the organic acid used as emulsifying agent for the organic waxes.

The organic sulfonates of the present invention will generally be employed in quantities of from about 10 to about 50% or more, more preferably from about 20 to about 35% and most preferably from about 25 to about 30% based on the total weight of the formulation (inclusive of water).

Techniques in Mixing

Apparatus: The apparatus for the present invention will be that conventionally utilized in the preparation of coatings compositions, e.g. kettles and mixing tanks having flow metering or measuring devices and agitation means, e.g. pumps mounted on side-arms connecting with the main vessel, internal stirrers, contra-rotating shearing devices and any of the other available devices which are well known to the art.

Temperature: The temperature during mixing may be different during different stages in the formulation. In general the water will be at about 200° F. (93° C.), the non-aqueous ingredients will be transferred and mixed together at about 225° F. (107° C.). However, these temperatures are not narrowly critical and will vary to provide faster mixing or better compatability of ingredients according to observation of those skilled in the art. For example, pressure vessels may be utilized for the purpose of lowering ingredient melting and boiling points, where useful, in order to provide better dispersion of difficult-to-mix ingredients.

Mixing Procedure: While the formulations of the present invention may be manufactured continuously if desired, batch techniques will be more usually employed. For example, the total amount of water desired in the finished formulation (e.g. 1700 gallons, 6,562 liters) is heated in a mixing vessel large enough to hold the entire batch of formulation until the water temperature is approximately 195° F. (90° C.). The wax, if any, esters, surfactants, coupling agents and any other non-aqueous ingredients are heated in a separate vessel until the temperature reaches about 225° F. (107° C.) with the various non-aqueous ingredients being added slowly while the vessel is agitated with conventional mixer. Where used, the esters may preferably be added with the carboxylic acids; the neutralizing ingredient, e.g. morpholine, triethanolamine, will be added after the other ingredients have been thoroughly mixed. After neutralization, which is generally visually observable as a distinct increase in viscosity, the non-aqueous ingredients are allowed to mix for 15 to 30 minutes and transferred over to the aqueous phase, which is agitated during the addition of the non-aqueous phase. Heating is discontinued after addition of the non-aqueous phase. The organic sulfonate is then mixed in and the finished formulation is allowed to cool with, preferably, constant agitation, after which the formulation is drawn off into shipping containers, e.g. tank cars, tank trucks, drums or smaller cans.

Quality Control

The finished formulation, prior to packaging, will generally be checked for pH, solids content, freeze-thaw stability, corrosion-protection under accelerated conditions and other tests utilizing techniques well known to the coatings industry.

Application

The formulations of the present invention may be applied to substrates to be protected by conventional application techniques, such as spraying, brushing, roller-coating, dipping, flow-coating, electrostatic airless spraying. Coating thickness can be varied by changing the formulation, the number of coats, or the amount applied per coat but in general will be in the range from about 0.5 to about 3 mils per coat after drying.

EXAMPLES

Example 1

(Formulation according to the invention providing long term protection)

Twenty-three point five parts by weight of deionized water are charged to a conventional mixing kettle rotary agitator and brought to a boil. Ten parts of Mobil Microwax 2305, a microcrystalline wax 3.5 parts of Hoechst wax, KSL, an esterified wax are charged to a second vessel also having a stirred reactor and to this is added 5 parts of 140-solvent, 1.5 parts of oleic acid, and 4.5 parts of Ektasolve EP. The mixture is heated to 225° F. (107° C.) with agitation. Zero point nine parts of morpholine and 0.5 parts triethanolamine are then added, and, after a few minutes, a thickening is observed, indicating the neutralization reaction has proceeded. The heating is stopped, and the contents of the non-aqueous vessel are immediately transferred to the vessel containing the water with continuous stirring. Fifty parts of SAC I sulfonate are mixed in. Heating is then terminated and the mixture continuously agitated until it cools into 100° F. (38° C.). The pH is then adjusted to 8.5 by addition of 0.5 of triethanolamine. About three parts of water are added to compensate for water lost during heating. The solids content is then found to be about 33%.

The resulting product is tested for corrosion resistance by applying to a cold rolled 1010 steel panel. After drying for 72 hours the test panel is subjected to a 5% salt (NaCl) spray at a temperature of 95° F. (35° C.) according to ASTM test B-117. The test panel resists failure (corrosion) for 1000 hours.

A similar test panel coated with the formulation of this example I resists 2,500 hours of exposure to 100% relative humidity at 120° F. (44° C.) according to the techniques of ASTM D-1748.

A sample of the above formulation survives five successive freeze-thaw cycles each comprising 16 hours at 0° F. (−18° C.) followed by eight hours at 77° F. (25° C.) with no separation or other evident deleterious effect.

A sample of the above formulation withstands 144 hours at 120° F. (49° C.) without separation or other observable deleterious effect.

When a panel as previously described is dipped into the above formulation and allowed to dry at room temperature and approximately 50% relative humidity, the coating is cured and dry to the touch in 60 minutes.

The thickness on the above test panels is approximately 2.5 to 3 mil (approximately 76.2 microns or 0.76 millimeters).

Examples 2-18

When various formulations are produced according to the parameters set forth in Table II, the results are as described in Table II and is set forth below:

Example 2: This is a formulation produced according to the techniques of Example 1 and is similar to it, except that 22% Mobil Microwax 2305 is used instead of 10%, 8% Hoechst KSL wax is used instead of 3.5%, 4% oleic acid is used instead of 1.5%, 2% morpholine is used instead of 0.9%, 1% monoethanolamine is present, triethanolamine is absent, 10% Rule 66 mineral spirits is used in place of 5% 140 flash mineral spirits, Ektasolve EP is absent, black P31B107 pigment is absent, about 53% water is used instead of about 23.5%, and SACI 400W is absent. The film performance, although acceptable, is considerably inferior to Example 1, probably primarily due to the absence of SACI 400W.

Example 3: This is a formulation produced according to the techniques of Example 1 and is similar to it, except that 1.6% Hoechst R-21 wax is present, Ektasolve EP is absent, 2.4% Hoechst KSL wax is used instead of 3.5%, 5.0% Rule 66 mineral spirits is used in place of 140 flash mineral spirits, and black P31B107 pigment is absent. Film performance is essentially equivalent to Example 1. Viscosity increase occurs during storage, probably because of lower solubility of Hoechst R-21 wax.

Example 4: This is a formulation produced according to the techniques of Example 2 and is similar to it, except that 3.2% Hoechst R-21 wax is present, 4.8% Hoechst KSL wax is used instead of 8.0%, 3.0% oleic acid is used instead of 4.0%, and 1% triethanolamine is used in place of 1% monoetheanolamine. The film performance, although acceptable, is considerably inferior to Example 1, probably primarily due to the absence of SACI 400W.

Example 5: This is a formulation produced according to the techniques of Example 1 and is similar to it, except that 10% Shellwax 300 is present, Hoechst KSL wax is absent, 8% Hoechst LP wax is present, 4% oleic acid is used instead of 1.5%, Ektasolve EP is absent, triethanolamine is absent, black P31B107 pigment is absent, 140 flash mineral spirits is absent, about 42% water is used instead of about 23.5%, and 25% SACI 400W is used instead of 50%. Viscosity of the composition increases considerably over time, probably due to the absence of one or both cosolvents (coupling solvents).

Example 6: This is a formulation produced according to the techniques of Example 2 and is similar to it, except that 8% Hoechst LP wax is used in place of 8% Hoechst KSL wax, 1% oleic acid is used instead of 4%, 1% morpholine is used instead of 2%, and 0.5% triethanolamine is used in place of 1% monoethanolamine. The film performance, although acceptable, is considerably inferior to Example 1, probably primarily due to the absence of SACI 400W. The emulsion "bursts" upon standing approximately 1 week at ambient temperature, probably due to low surfactant level.

Example 7: This is a formulation produced according to the techniques of Example 2 and is similar to it, except that 14.5% Mobil Microwax 2305 is used instead of 22%, 5.3% Hoechst LP wax is present, Hoechst KSL wax is absent, 3% morpholine is used instead of 2%, 1% triethanolamine is used in place of 1% monoethanolamine, and 10% Degras lanolin ester is present. The formulation is very viscous and paste-like, probably due to the absence of surfactant.

Example 8: This is a formulation produced according to the techniques of Example 2 and is similar to it, except that, 8% Hoechst LP wax is used in place of 8% Hoechst KSL wax 5% Rule 66 mineral spirits is used instead of 10%, and about 58% water is used instead of about 53%. The film exhibits water sensitivity probably due to the acid content from the wax, Hoechst LP, plus oleic acid level.

Example 9: This is a formulation produced according to the techniques of Example 2 and is similar to it, except that 4% Hoechst R-21 is present, 6% Hoechst KSL is used instead of 8%, and 1% diethanolamine is used in place of 1% monoethanolamine. Some solvents drop-out occurs after about 1 week, probably due to lower solubility of Hoechst R-21 wax.

Example 10: This is a formulation produced according to the techniques of Example 9 and is similar to it, except that diethanolamine is absent, some solids drop-out occurs after about 1 week, probably due to lower solubility of Hoechst R-21 wax.

Example 11: This is a formulation produced according to the techniques of Example 9 and is similar to it, except that 6% Hoechst R-21 wax is used instead of 4%, 2% KSL wax is used instead of 6%, 2% diethanolamine is used instead of 1%, Rule 66 mineral spirits is absent, and about 64% water is used instead of about 53%. The emulsion forms but "bursts" during cool-down, probably due to the absence of one or both cosolvents (coupling solvents).

Example 12: This is a formulation produced according to the techniques of Example 1 and is similar to it, except that 2% Hoechst R-21 is present Ektasolve EP is absent, black P31B107 pigment is absent, 4% Rule 66 mineral spirits is used in place of 5% 140° F. flash mineral spirits, and about 27% water is used instead of about 23.5%. The film properties are excellent. Viscosity increases over time, probably due to lower solubility to Hoechst R-21 wax.

Example 13: This is a formulation produced according to the techniques of Example 9 and is similar to it, except that 4% Hoechst KSL wax is used instead of 6%, 1.5% morpholine is used instead of 2% oleic acid is used instead of 4%, and about 57% water is used instead of about 53%. The emulsion "bursts" at ambient temperature within minutes, probably due to the lower level as surfactant.

Example 14: This is a formulation produced according to the techniques of Example 9 and is similar to it, except that 8% Hoechst R-21 wax is used instead of 4%, 2% Hoechst KSL wax is used instead of 6%, 0.5% morpholine is used instead of 2%, 1% oleic acid is used instead of 4%, and about 57% water is used instead of about 53%. Some solids drop-out, probably Hoechst R-21 wax, occurs within 1 day. About 20% emulsion separation occurs after about 1 week at ambient temperature, probably due to a lower level of surfactant.

Example 15: This is a formulation produced according to the techniques of Example 9 and is similar to it, except that 4% Hoechst KSL wax is used instead of 6%, and 1% oleic acid is used instead of 4%. The emulsion "bursts" during cool-down, probably due to lower surfactant level.

Example 16: This is a formulation produced according o the techniques of Example 9 and is similar to it, except that 0.5% triethanolamine is present, diethanolamine is absent, and 3% oleic acid is used instead of 4%. The emulsion forms at ambient temperature, but, after storage at about 30° F. (−1° C.) for 1 day, the emulsion separates, probably due to lower surfactant level.

Example 17: This is a formulation produced according to the techniques of Example 2 and is similar to it, except that 26% Mobil Microwax 2305 is used instead of 22%, 2% Hoechst R-21 wax is present, Hoechst KSL wax is absent, monoethanolamine is absent, Rule 66 mineral spirits is absent, 5% butyl cellosolve is present, and about 61% water is used instead of about 53%. The emulsion "bursts" a few minutes after forming, probably due to the absence of hydrocarbon cosolvent (coupling solvent).

Example 18: This is a formulation produced according to the techniques of Example 2 and is similar to it, except that 8% Hoechst R-21 wax is used in place of 8% Hoechst KSL wax, monoethanolamine is absent, Rule 66 mineral spirits in absent, about 46% water is used instead of about 53%, and 20% cellosolve acetate is present. The emulsion "bursts" at about 150° F. (65° C.) during cool-down, probably due to the absence of hydrocarbon cosolvent (coupling solvent).

| EXAMPLE: | 1 | 2 | 3 | 4 | 5 | 6 | 7 | 8 | 9 |
|---|---|---|---|---|---|---|---|---|---|
| Test Results: | | | | | | | | | |
| Emulsion Stability | good | good | good | good | good | poor | poor | good | poor |
| Storage Stability | good | good | poor | fair | poor | poor | poor | good | poor |
| Freeze-Thaw | good | good | fair | good | good | — | good | good | — |
| Viscosity | 8,000 cps | 6,800 cps | 12,000 cps | — | 10,000 cps | — | 60,000 cps | — | — |
| Film Integrity | good | good | good | good | good | poor | fair | good | — |
| Drytime (Minutes) | 60 | 60 | 60 | 60 | 60 | 45 | 90 | 60 | — |
| Early H2O Resistance | good | good | good | good | good | — | — | poor | — |
| Salt Spray (ASTM B117): | | | | | | | | | |
| Cold Rolled Steel (Bare) | — | — | — | — | — | — | — | — | — |
| Carbon Steel (Polished) | 1000 | 140 | 500+ | 150+ | 300+ | 100 | 200 | 50 | — |
| Thickness (mil) | 2.5 | 2.0 | 2.5 | 2.5 | 2.5 | 2.0 | 2.0 | — | — |
| Humidity ASTM D-1748 | 2500+ | — | 2500+ | — | — | — | 700 | — | — |
| Weatherometer ASTM G 23 | 2,000+ | — | 2,000+ | — | — | — | — | — | — |
| Sprayability | good | good | fair | fair | fair | poor | — | — | — |
| Comments | best made | | | | | Emul. burst in stor. | | | |

| EXAMPLE: | 10 | 11 | 12 | 13 | 14 | 15 | 16 | 17 | 18 |
|---|---|---|---|---|---|---|---|---|---|
| Test Results: | | | | | | | | | |
| Emulsion Stability | poor | poor | poor | — | poor | poor | fair | poor | poor |
| Storage Stability | poor | — | — | — | poor | — | poor | — | — |
| Freeze-Thaw | — | — | — | — | — | — | poor | — | — |
| Viscosity | — | — | 100,000 cps | — | — | — | — | — | — |
| Film Integrity | — | — | — | — | — | — | good | — | — |
| Drytime (Minutes) | — | — | — | — | — | — | 60 | — | — |
| Early H2O Resistance | — | — | — | — | — | — | good | — | — |
| Salt Spray (ASTM B117): | | | | | | | | | |
| Cold Rolled Steel (Bare) | — | — | — | — | — | — | — | — | — |

-continued

| | | | | | | | | | |
|---|---|---|---|---|---|---|---|---|---|
| Carbon Steel (Polished) | — | — | — | — | — | — | 150 hrs | — | — |
| Thickness (mil) | | | | | | | 2.0 | | |
| Humidity ASTM D-1748 | — | — | — | — | — | — | — | — | — |
| Weatherometer ASTM G 23 | — | — | — | — | — | — | — | — | — |
| Sprayability | — | — | — | — | — | — | fair | — | — |
| Comments | | Emul. burst in kettle | | Emul. burst in kettle | Emul. burst after 7 days stor. | | Emul. burst in kettle | Emul. burst at low temp. | Emul. burst in kettle |

TABLE II

| EXAMPLE: | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| RUN# | 2-62 | 2-26 | 210 | 205 | 185 | 211 | 212 | 2-31 | 198 | 202 | 197 | 204 | 201 | 199 | 200 | 203 | 193 | 196 |
| Organic Wax: | | | | | | | | | | | | | | | | | | |
| Mobil Micro Wax 2305 | 10.0 | 22.0 | 11.0 | 22.0 | 10.0 | 22.0 | 14.5 | 22.0 | 20.0 | 20.0 | 20.0 | 10.0 | 20.0 | 20.0 | 20.0 | 20.0 | 26.0 | 20.0 |
| Shellwax 300 | | | | | 10.0 | | | | | | | | | | | | | |
| Hoechst R-21 | | | 1.6 | 3.2 | | | | | 4.0 | 4.0 | 6.0 | 2.0 | 4.0 | 8.0 | 4.0 | 4.0 | 2.0 | 8.0 |
| Hoechst Wax KSL | 3.5 | 8.0 | 2.4 | 4.8 | | | | | 6.0 | 6.0 | 2.0 | 3.0 | 4.0 | 2.0 | 4.0 | 6.0 | | |
| Hoechst Wax LP | | | | | 8.0 | 8.0 | 5.3 | 8.0 | | | | | | | | | | |
| Lanolin Ester | | | | | | | | | | | | | | | | | | |
| Degras Lanolin | | | | | | | 10.0 | | | | | | | | | | | |
| Carboxylic Acid: | | | | | | | | | | | | | | | | | | |
| Emery 220 | 1.5 | 4.0 | 1.75 | 3.0 | 4.0 | 1.0 | | 4.0 | 4.0 | 4.0 | 4.0 | 1.5 | 2.0 | 1.0 | 1.0 | 3.0 | 4.0 | 4.0 |
| Amines: | | | | | | | | | | | | | | | | | | |
| Morpholine | 0.9 | 2.0 | 1.0 | 2.0 | 1.0 | 1.0 | 3.0 | 2.0 | 2.0 | 2.0 | 2.0 | 1.0 | 1.5 | .5 | 2.0 | 2.0 | 2.0 | 2.0 |
| Monoethanol amine | | 1.0 | | | | | | | 1.0 | | | | | | | | | |
| Diethanolamine | | | | | | | | | | 1.0 | | 2.0 | | 1.0 | 1.0 | 1.0 | | |
| Triethanolamine | 0.45 | | .5 | 1.0 | | .5 | 1.0 | | | | | .4 | | | | .5 | | |
| Coupling Agent: | | | | | | | | | | | | | | | | | | |
| Rule 66 Mineral Spirits | | 10.0 | 5.0 | 10.0 | | 10.0 | 10.0 | 5.0 | 10.0 | 10.0 | | 5.0 | | 10.0 | 10.0 | 10.0 | | |
| Ektasolve EP | 4.5 | | | | | | | | | | | | | | | | | |
| Butyl Cellosolve | | | | | | | | | | | | | | | | | 5.0 | |
| Cellosolve Acetate | | | | | | | | | | | | | | | | | | 20.0 |
| 140 Solvent | 5.0 | | | | | | | | | | | | | | | | | |
| Defoamer: | | | | | | | | | | | | | | | | | | |
| Surfynol 104A. | .02 | .1 | .05 | | | .1 | .1 | .1 | | .5 | | .05 | .5 | | .5 | | .2 | .2 |
| Drew L-447 | | | | 0.1 | | | | | 0.2 | | 0.2 | | | 0.1 | | 0.2 | | |
| Sulfonate: | | | | | | | | | | | | | | | | | | |
| SACI 400-W (60% H$_2$O) | 50.0 | | 50.0 | | 25.0 | | | | | | | 50.0 | | | | | | |
| Water: | | | | | | | | | | | | | | | | | | |
| Water | 23.5 | 53.0 | 26.7 | 53.4 | 42.0 | 57.4 | 56.0 | 58.0 | 52.8 | 54.5 | 63.8 | 26.6 | 57.0 | 57.4 | 55.5 | 54.5 | 60.8 | 46.0 |
| Pigment: | | | | | | | | | | | | | | | | | | |
| Penncolor Black 31B107 | 1.0 | | | | | | | | | | | | | | | | | |

Modifications

It will be understood by those skilled in the art that the invention is not to be restricted by the examples which merely illustrate the invention and that the invention is susceptible to a wide variety of modifications and variations without departing from the spirit thereof. For example, the formulations may contain other useful ingredients such as biocides, antifoam agents, pigments, dyes and leveling agents, well known to those skilled in coatings technology. Also, the formulations of the invention remain stable and useful, though less protective, when the SACI is omitted.

What is claimed is:

1. An anti-corrosive, storage stable, rapidly drying, emulsified oil in water and water reducible and dispersible coating composition having a pH in the range of 7.0 to 10, and capable of application and flow on a solid substrate, comprising:

(a) about 0.5 to 30% by weight of organic wax components having a melting point above about 50° C.; said wax containing ester groups;
    (b) about 0 to 30% of a polyol ester derived from the polyester of one of:
      stearic acid, isostearic acid, oleic acid and lanolinic acid,
      and a polyol selected from the group consisting of: neopentyl glycol, trimethylol propane, pentaerythritol and dipentaerythritol;
    (c) about 0.5 to 6% of a surfactant;
    (d) about 10 to 30% of a coupling agent, comprising a $C_5$-$C_{30}$ liquid hydrocarbon coupling component and $C_2$-$C_{20}$ alcohol in a ratio of between 1:1 and 10:1 by weight, respectively, selected from the group consisting of:
      mineral spirits, kerosene, 140-solvent, ethylene glycol ether, butyl cellosolve, diethylene glycol monoethyl ether, ethylene glycol monopropyl ether, propyl cellosolve, ethyl cellosolve, diethylene glycol monoethyl ether, ethylene glycol monoacetate, diethylene glycol monoproprionate, diethylene glycol monoacetate, propylene glycol monoacetate, ethanol, isopropanol and isobutanol.

(e) about 30 to 97% of water.

2. A composition of claim 1, in which said coating further comprises about 2 to 8% of a carboxylic acid, and about 1 to 5% of an amine, said acid and said amine forming a salt providing at least a portion of said surfactant.

3. A composition of claim 2, in which said coating further comprises at least one of an emulsifiable amide and an organic sulfonate replacing part of said carboxylic acid and said amine.

4. A composition of claim 1, in which said wax is a mixture of microcrystalline wax and wax comprising ester groups.

5. A composition of claim 4, in which said wax has a melting point above about 70° C.

6. A composition of claim 1, in which said organic wax contains at least 50%, by weight, of essentially saturated wax.

7. A composition of claim 6, in which all or part of said essentially saturated wax is microcrystalline paraffinic wax.

8. A composition of claim 7, in which said wax-comprising ester groups is an oxygenated wax which has been esterified and has a melting point of above 70° C.

9. A composition of claim 1, in which said polyol ester is pentaerythritol dilanolate.

10. A composition of claim 2, in which said carboxylic acid possesses about 6 to 30 carbon atoms per carboxylic acid group.

11. A composition of claim 10, in which at least one of said carboxylic acids is chosen from the following: oleic acid, linoleic acid, isostearic acid, and stearic acid.

12. A composition of claim 2, in which said amine is chosen from a group of the following: morpholine, triethanolamine, ammonia, diethanolamine, and ethanolamine.

13. A composition of claim 2, in which said amide comprises oleyl diethanol amide or sorbitan mono oleate.

14. A composition of claim 1, in which said coupling agent comprises an ether-alcohol.

15. A composition of claim 16, in which said ether-alcohol is chosen from a group of the following: propyl cellosolve, butyl cellosolve, ethyl cellosolve, diethylene glycol monoethyl ether.

16. A composition of claim 1, in which said coupling agent is an alcohol ether-ester.

17. A composition of claim 1, in which alcohol ether-ester coupling agent is chosen from a group of the following: ethylene glycol monoacetate, diethylene glycol monoproprionate, diethylene glycol monoacetate and propylene glycol monoacetate.

18. A method of producing an anti-corrosive, storage stable, rapidly drying, emulsified oil in water and water reducible and dispersible coating composition having a pH in the range of 7.0 to 10, and capable of application and flow on a solid substrate, comprising the following steps:

(a) mixing, in an essentially fluid state, a wax component, carboxylic acid, coupling agent comprising a $C_5$-$C_{30}$ liquid hydrocarbon coupling component and a $C_2$-$C°$ alcohol in a ratio of between 1:1 and 10:1 by weight, respectively, selected from the group consisting of:

mineral spirits, kerosene, 140-solvent, ethylene gylcol ether, butyl cellpsolve, diethylene glycol monoethyl ether, ethylene glycol monopropyl ether, propyl cellosolve, ethyl cellosolve, diethylene glycol monoethyl ether, ethylene glycol monoacetate, diethylene glycol monoproprionate, diethylene glycol monoacetate, propylene glycol monoacetate, ethanol, isopropanol and isobutanol; and sufficient polyol ester to provide desired corrosion protection, said polyol ester derived from the polyester of one of:

stearic acid, isostearic acid, oleic acid and lanolinic acid, and a polyol selected from the group consisting of:

neopentyl glycol, trimethylol propane, pentaerythritol and dipentaerythritol;

(b) adding an amount of amine sufficient to effect dispersibility of the mixture in water and to neutralize the carboxylic acid;

(c) adding water, with agitation, at such temperature so as to cause dispersion of the mixture;

(d) adjusting the pH of the total mixture from about 7 to about 10.

19. The method of producing a coating composition of claim 18, capable of high temperature, long term storage, wherein said coupling agent comprises propyl cellosolve and a liquid hydrocarbon solvent.

20. A method of claim 18, in which part of said carboxylic acid and amine are replaced by an emulsifiable amide or an organic sulfonate.

21. A method for coating solid subtrates, wherein said composition of claim 1, is applied to metal.

22. A method for coating solid substrates, wherein said composition of claim 1 is applied by dipping.

23. A method for coating solid substrates, wherein said composition of claims 1 is applied by brushing.

24. A method for coating solid substrates, wherein said composition of claims 1 is applied by rolling.

25. A method for coating solid substrates, wherein said composition of claims 1 is applied by electrostatic spraying.

26. A method for coating solid substrates, wherein said composition of claims 1 is applied by hand spraying.

27. A composition of claim 2 in which at least a portion of said carboxylic acid is contained in said wax components.

28. A manufacture comprising a substrate coated with a coating composition of claim 1.

29. A composition of claim 1 or claim 7 additionally comprising a metal sulfonate salt.

30. A composition of claim 29 wherein the metal sulfonate salt comprises metallo-adherent sulfonate particles.

31. A composition of claim 29 wherein said metal sulfonate salt comprises SACI.

32. A composition according to claim 29, wherein the composition comprises 10 to 50%, and more preferably 20 to 35%, and most preferably 25 to 30% metal sulfonate salt by weight based on the total formulation.

33. A composition according to claim 1, comprising:

(a) about 5 to 25% of component (a);

(b) about 5 to 10% of component (b);

(c) about 3 to 5% of component (c);

(d) about 15 to 25% of component (d); and (e) at least 40% of component (e).

34. A composition according to claim 1, comprising:
(a) about 12 to 20% of component (a);
(b) about 8 to 12% of component (b);
(c) about 3 to 4% of component (c);
(d) about 18 to 22% of component (d); and
(e) at least 45% of water.

35. An anti-corrosive, storage stable, rapidly drying, emulsified oil in water and water reducible and dispersible coating composition, capable of application and flow on a substrate comprising:
(a) 10% microcrystalline wax;
(b) 3.5% esterified wax;
(c) 5% 140solvent;
(d) 1.5% oleic acid;
(e) 4.5% propyl cellosolve;
(f) 0.9% morpholine;
(g) 0.45% triethanolamine;
(h) 50% over-based organic sulfonate solution; and
(i) 23.5% water.

36. A composition according to claim 1, in which said wax is admixed with less than 0.1 to 5 weight percent and preferably 0.1 to 3 weight percent, based on the weight of the wax, of oil.

37. A composition according to claim 1, in which said organic wax components comprise oxygenated waxes having an acid number in the range of 15 to about 200, and most preferably from 25 to about 45.

38. A composition according to claim 1, wherein the pH is in the range of 7.0 to 10, and preferably 8.0 to 9.0.

39. A method of producing a coating composition of claim 18, including adding an organic sulfonate after step (c) and before step (d).

40. A method according to claim 18, wherein step (a) is conducted at 107° C. and the water added at (c) has a temperature of about 90° C.

41. An anti-corrosive, storage stable, rapidly drying, emulsified oil in water and water reducible and dispersible coating composition, capable of application and flow on a substrate comprising:
(a) mixing, in an essentially fluid state, 10% microcrystalline wax, 3.5% esterified wax, 5% 140-solvent, 1.5% oleic acid, and 4.5% propyl cellosolve;
(b) adding 0.9% morpholine and 0.45 triethanolamine with further mixing;
(c) adding 23.5% water with agitation, at such temperature so as to cause dispersion of the mixture;
(d) adding 50% of an over-based organic sulfonate solution with further mixing; and
(e) adding about 0.5% of triethanolamine to adjust pH to 8 to 8.5.

* * * * *